US012028362B1

United States Patent
Cui et al.

(10) Patent No.: US 12,028,362 B1
(45) Date of Patent: Jul. 2, 2024

(54) DETECTING ANOMALOUS STORAGE SERVICE EVENTS USING AUTOENCODERS

(71) Applicant: Amazon Technologies, Inc., Seattle, WA (US)

(72) Inventors: Qian Cui, Bellevue, WA (US); Wei Ding, Issaquah, WA (US); Oleg Yurievich Polyakov, Weehawken, NJ (US); Baris Coskun, Glen Rock, NJ (US)

(73) Assignee: Amazon Technologies, Inc., Seattle, WA (US)

( * ) Notice: Subject to any disclaimer, the term of this patent is extended or adjusted under 35 U.S.C. 154(b) by 636 days.

(21) Appl. No.: 17/115,107

(22) Filed: Dec. 8, 2020

(51) Int. Cl.
*H04L 9/40* (2022.01)
*G06F 18/214* (2023.01)
*G06N 3/045* (2023.01)
*G06N 3/047* (2023.01)
*G06N 3/088* (2023.01)
*G06V 10/75* (2022.01)
*H04L 67/1097* (2022.01)

(52) U.S. Cl.
CPC ...... *H04L 63/1425* (2013.01); *G06F 18/2148* (2023.01); *G06N 3/045* (2023.01); *G06N 3/047* (2023.01); *G06N 3/088* (2013.01); *G06V 10/757* (2022.01); *H04L 63/1416* (2013.01); *H04L 67/1097* (2013.01)

(58) Field of Classification Search
CPC .......... H04L 63/1425; H04L 63/1416; G06N 3/045; G06N 3/047; G06N 3/088
USPC ........................................................ 726/22
See application file for complete search history.

(56) References Cited

U.S. PATENT DOCUMENTS

| 10,873,456 | B1 * | 12/2020 | Dods ..................... H04L 9/0822 |
| 11,174,522 | B2 * | 11/2021 | Baumgarten .......... G16B 40/30 |
| 11,374,952 | B1 | 6/2022 | Coskun et al. |
| 11,443,137 | B2 * | 9/2022 | Schaefer ............. G06V 10/454 |

(Continued)

OTHER PUBLICATIONS

An, J., "Variational Autoencoder based Anomaly Detection using Reconstruction Probability", Special Lecture on IE, 2(1), Dec. 27, 2015, pp. 1-18.

(Continued)

*Primary Examiner* — Badri Narayanan Champakesan
(74) *Attorney, Agent, or Firm* — Nicholson De Vos Webster & Elliott LLP

(57) ABSTRACT

Techniques for enabling the identification of anomalous events associated with an object storage service of a cloud provider network using a variational autoencoder model including a pre-trained embedding for selected features of events are described. A variational autoencoder, for example, encodes data into a latent space and reconstructs approximations of the data from an encoding in the latent space. In this context, for example, anomalous events of interest might represent unauthorized or abusive behavior associated with storage resources provided by an object storage service (or in association with other types of computing resources provided by other services of a cloud provider network). Legitimate (or benign) access patterns to an object storage service can be modeled by utilizing observed data plane events stored by an account activity monitoring service. Once trained, the model can be used to identify anomalous events.

20 Claims, 8 Drawing Sheets

(56) References Cited

U.S. PATENT DOCUMENTS

| | | | |
|---|---|---|---|
| 2019/0228312 A1* | 7/2019 | Andoni | G06F 18/2433 |
| 2020/0076840 A1* | 3/2020 | Peinador | G06F 21/552 |
| 2020/0076841 A1* | 3/2020 | Hajimirsadeghi | H04L 63/1408 |
| 2020/0327404 A1* | 10/2020 | Miotto | G06F 18/2415 |
| 2021/0034918 A1* | 2/2021 | Schaefer | G06V 10/454 |

OTHER PUBLICATIONS

Gutmann, M., et al., "Noise-contrastive estimation: A new estimation principle for unnormalized statistical models", Proceedings of the Thirteenth International Conference on Artificial Intelligence and Statistics, PMLR, vol. 9, 2010, pp. 297-304.

Kingma, D. P., et al., "Auto-Encoding Variational Bayes", arXiv:1312.6114 [stat.ML], Dec. 10, 2022, pp. 1-14.

Mikolov, T., et al., "Efficient Estimation of Word Representations in Vector Space", arXiv:1301.3781 [cs.CL], Jan. 13, 2013, pp. 1-12.

Sakurada, M., et al., "Anomaly Detection Using Autoencoders with Nonlinear Dimensionality Reduction", MLSDA'14: Proceedings of the MLSDA 2014 2nd Workshop on Machine Learning for Sensory Data Analysis, Dec. 2014, pp. 1-8.

Tolstikhin, I., et al., "Wasserstein Auto-Encoders", arXiv:1711.01558 [stat.ML], Nov. 5, 2017, pp. 1-20.

Xu, H., et al., "Unsupervised Anomaly Detection via Variational Auto-Encoder for Seasonal KPIs in Web Applications", WWW '18: Proceedings of the 2018 World Wide Web Conference, Apr. 2018, pp. 187-196.

* cited by examiner

DETECTING ANOMALOUS STORAGE SERVICE EVENTS USING AUTOENCODERS

BACKGROUND

Cloud provider networks typically provide various types of data storage services including object storage services. An object storage service enables users to store large volumes of data and such data may often include sensitive and proprietary content that users desire to protect. While cloud provider networks also typically provide reliable access control mechanisms, the security of users' data can still be compromised, e.g., due to stolen authentication credentials or policy misconfigurations.

BRIEF DESCRIPTION OF DRAWINGS

Various embodiments in accordance with the present disclosure will be described with reference to the drawings, in which.

DETAILED DESCRIPTION

Figure 1:
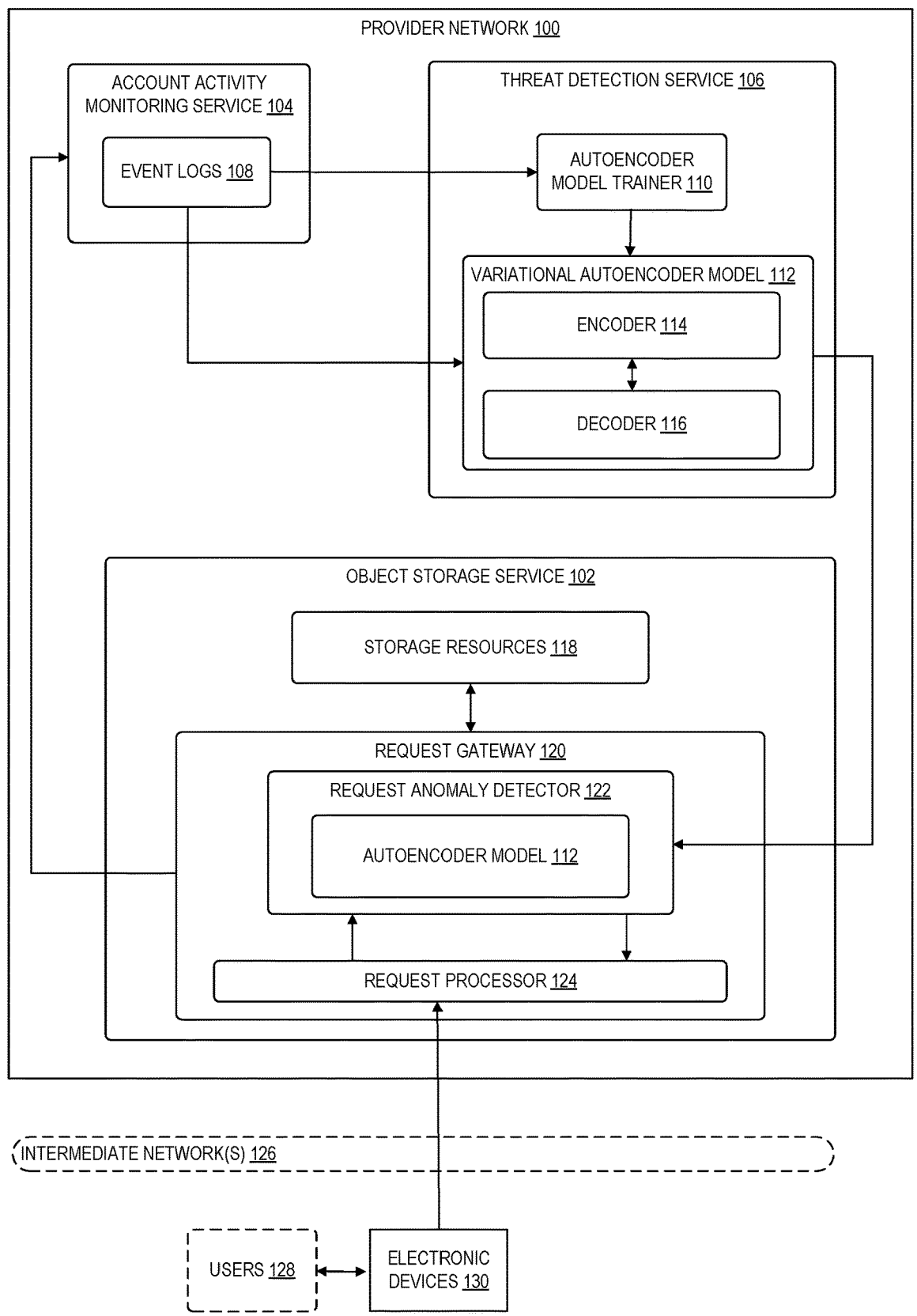
FIG. 1 is a diagram illustrating a networked computing environment that enables the identification of anomalous events associated with an object storage service of a cloud provider network using a variational autoencoder model according to some embodiments.

The present disclosure relates to methods, apparatus, systems, and non-transitory computer-readable storage media for enabling the identification of anomalous events associated with an object storage service of a cloud provider network using a variational autoencoder model including a pre-trained embedding for selected features of events. A variational autoencoder, for example, encodes data into a latent space and reconstructs approximations of the data from an encoding in the latent space. In this context, for example, anomalous events of interest might represent unauthorized or abusive behavior associated with storage resources provided by an object storage service (or in association with other types of computing resources provided by other services of a cloud provider network). In some embodiments, legitimate (or benign) access patterns to an object storage service can be modeled by utilizing observed data plane events stored by an account activity monitoring service. Once trained, the model can be used to identify anomalous events. As indicated, according to some embodiments, the variational autoencoder model described herein uses a pre-trained embedding layer that exploits inherent similarities between selected features of such events.

Cloud provider networks typically provide various types of storage services including object storage services, which generally enable users to store and retrieve data from storage resources (sometimes referred to as storage "buckets"). The growth of cloud provider networks however has been accompanied by a surge of reported data breaches stemming from misconfigured data access policies to malicious insider attacks. In some embodiments, a cloud provider network further provides an account activity monitoring service enabling users to log data related to their accounts and to monitor for such unauthorized or malicious activity. In the context of a storage virtualization service, an account activity monitoring service provides users with a history of events related to storage resources including management operations (e.g., listing available storage resources and creating new storage resources) as well as storage operations, e.g., events associated with a user downloading, copying, or deleting data stored in such storage resources. Each of the events stored by an account activity monitoring service, for example, includes data indicating an action performed, a user identifier, an Internet Protocol (IP) address associated with the request, a user agent, among other possible attributes. This dataset enables users to build and deploy deep learning methods to improve the security of such storage services and other services of a cloud provider network.

According to embodiments described herein, a variational autoencoder-based model is trained and used to identify anomalous events associated with an object storage service, where such identified events may be indicative of unauthorized or abusive behavior. In some embodiments, legitimate or benign access patterns to storage resources can be modeled by utilizing observed storage service data plane events, e.g., events logged by an account activity monitoring service. In some embodiments, the model described herein handles high-cardinality categorical features associated with such events by using a pre-trained embedding layer to exploit inherent similarities between such features.

In some embodiments, to determine whether requests to perform actions with respect to storage resources provided by an object storage service are potentially anomalous with respect to a particular user, the trained model is used to calculate normalcy scores predicted for a generated reconstruction of an incoming request by a variational autoencoder. For example, the goal of the model is to measure the normalcy of object-level operations on a storage resource given the user identity, location, and user agent. In some embodiments, the model introduces a pretrained embedding for a username and storage resource name (or "bucket" name) parameters into the conditional part of the model instead of using randomly initialized ones as in other models. Additionally, the model adds the storage resource name parameter into the conditional part of the model. Generally, the normalcy scores generated by such a model indicate a relative closeness of the attributes of the incoming request with attributes of the closest matching requests in a training data set. Based on the generated normalcy score for a request, a determination of whether the request is potentially anomalous or non-anomalous may be performed. For each incoming request, a system can allow or disallow performance of the requested action based on the generated normalcy score, among other possible actions.

FIG. 1 is a diagram illustrating an environment in which a variational autoencoder is trained using historical activity data and further used by a request gateway to determine whether requests involving storage resources provided by a storage service are potentially anomalous events and process the requests based on the determination of whether the requests are potentially anomalous events according to some embodiments. In other embodiments, a model similarly may be used by a threat detection service or other service to identify and alert detected occurrences of anomalous events. As illustrated, the cloud provider network 100 includes an object storage service 102, which includes a request gateway 120 and storage resources 118, a threat detection service 106 including a variational autoencoder trainer 110, an account activity monitoring service 104 that generates event logs 108.

A provider network 100 (or "cloud" provider network 100) provides users with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources may be provided as services, such as a hardware virtualization service that can execute compute instances, a storage service that can store data objects, etc. The users (or "customers") of provider networks 100 (e.g., users 128) may utilize one or more user accounts that are associated with a customer account, though these terms may be used somewhat interchangeably depending upon the context of use. Users may interact with a provider network 100 using computing devices 130 and across one or more intermediate networks 126 (e.g., the internet) via one or more interface(s), such as through use of application programming interface (API) calls, via a console implemented as a website or application, etc. An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another. The interface(s) may be part of, or serve as a front-end to, a control plane of the provider network 100 that includes "backend" services supporting and enabling the services that may be more directly offered to customers.

For example, a cloud provider network (or just "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

A cloud provider network can be formed as a number of regions, where a region is a geographical area in which the cloud provider clusters data centers. Each region includes multiple (e.g., two or more) availability zones (AZs) connected to one another via a private high-speed network, for example a fiber communication connection. An AZ (also known as an availability domain, or simply a "zone") provides an isolated failure domain including one or more data center facilities with separate power, separate networking, and separate cooling from those in another AZ. A data center refers to a physical building or enclosure that houses and provides power and cooling to servers of the cloud provider network. Preferably, AZs within a region are positioned far enough away from one another so that a natural disaster (or other failure-inducing event) should not affect or take more than one AZ offline at the same time.

Customers can connect to AZ of the cloud provider network via a publicly accessible network (e.g., the Internet, a cellular communication network), e.g., by way of a transit center (TC). TCs are the primary backbone locations linking customers to the cloud provider network and may be collocated at other network provider facilities (e.g., Internet service providers (ISPs), telecommunications providers) and securely connected (e.g., via a VPN or direct connection) to the AZs. Each region can operate two or more TCs for redundancy. Regions are connected to a global network which includes private networking infrastructure (e.g., fiber connections controlled by the cloud provider) connecting each region to at least one other region. The cloud provider network may deliver content from points of presence (or "POPs") outside of, but networked with, these regions by way of edge locations and regional edge cache servers. This compartmentalization and geographic distribution of computing hardware enables the cloud provider network to provide low-latency resource access to customers on a global scale with a high degree of fault tolerance and stability.

Generally, the traffic and operations of a provider network may broadly be subdivided into two categories: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information). The data plane includes customer resources that are implemented on the provider network (e.g., computing instances, containers, block storage volumes, databases, file storage). Data plane traffic generally includes non-administrative operations such as transferring customer data to and from the customer resources. The control plane components are typically implemented on a separate set of servers from the data plane servers, and control plane traffic and data plane traffic may be sent over separate/distinct networks.

To provide these and other computing resource services, provider networks 100 often rely upon virtualization techniques. For example, virtualization technologies may be used to provide users the ability to control or utilize compute resources (e.g., a "compute instance" such as a VM using a guest operating system (O/S) that operates using a hypervisor that may or may not further operate on top of an underlying host O/S, a container that may or may not operate in a VM, a compute instance that can execute on "bare metal" hardware without an underlying hypervisor), where one or multiple compute resources can be implemented using a single electronic device. Thus, a user may directly utilize a compute resource (e.g., provided by a hardware virtualization service) hosted by the provider network to perform a variety of computing tasks. Additionally, or alternatively, a user may indirectly utilize a compute resource by submitting code to be executed by the provider network (e.g., via an on-demand code execution service), which in turn utilizes one or more compute resources to execute the code—typically without the user having any control of or knowledge of the underlying compute instance(s) involved.

For example, in various embodiments, a "serverless" function may include code provided by a user or other entity—such as the provider network itself—that can be executed on demand. Serverless functions may be maintained within provider network 100 by an on-demand code execution service and may be associated with a particular user or account or be generally accessible to multiple users/accounts. A serverless function may be associated with a Uniform Resource Locator (URL), Uniform Resource Identifier (URI), or other reference, which may be used to invoke the serverless function. A serverless function may be executed by a compute resource, such as a virtual machine, container, etc., when triggered or invoked. In some embodiments, a serverless function can be invoked through an application programming interface (API) call or a specially formatted HyperText Transport Protocol (HTTP) request message. Accordingly, users can define serverless functions that can be executed on demand, without requiring the user to maintain dedicated infrastructure to execute the serverless function. Instead, the serverless functions can be executed on demand using resources maintained by the provider network 100. In some embodiments, these resources may be maintained in a "ready" state (e.g., having a pre-initialized runtime environment configured to execute the serverless functions), allowing the serverless functions to be executed in near real-time.

Referring to FIG. 1, in some embodiments, event logs 108 are obtained from an account activity monitoring service 104 to train a variational autoencoder model 112 to be used to detect anomalous events associated with an object storage service 102. An account monitoring service 104, for example, can be a service that enables various types of auditing and logging of user accounts within a cloud provider network 100. For example, using an account monitoring service 104, users can log, continuously monitor, and retain account activity related to actions performed involving computing resources provided by various other services of a cloud provider network 100 (e.g., including storage resources, computing resources, networking resources, and the like). In some embodiments, the event logs 108 contain many features and parameters reflecting a record of actions requested by users of the object storage service 102 (or possibly other services). In some embodiments, to build a profile of such events to be used to train a variational autoencoder model 112, in some embodiments, some or all of the following features associated with such events may be used: an account identifier, a username, a user type, an event name, an autonomous system number organization, a user agent, and a request parameter. In some embodiments, the request parameter feature that is associated with each API call may be further parsed to extract additional features identifying a storage resource (e.g., a bucket name) and authentication information.

In some embodiments, the request gateway 120 is a gateway through which users request the performance of various actions with respect to storage resources 118 provided by an object storage service 102. For example, the request gateway 120 receives requests from users 128 using electronic devices 130 and, in some embodiments, calculates a normalcy score for requests received using a request anomaly detector 122 and variational autoencoder model 112. As described in more detail herein, a variational autoencoder model 112 attempts to reconstruct a request from an encoding of the request, and uses the calculated normalcy score to determine whether a request is potentially anomalous, thereby enabling the request gateway 120 to take action to handle the request based on the determination of whether a request is potentially anomalous (e.g., to flag the request as anomalous or block the request). As illustrated, the request gateway 120 includes a request processor 124 and a request anomaly detector 122.

In some embodiments, a request processor 124 receives incoming requests from client devices 130 that instruct the object storage service 102 to perform one or more actions with respect to storage resources 118. As discussed, the request processor 124 may provide information about the incoming request (e.g., event attributes defining the properties of the requested event, also referred to herein as "request attributes") and contextual attributes defining information about the user that generated the request to the request anomaly detector 122 to obtain an anomaly score (or conversely a normalcy score). When the request processor 124 receives the anomaly score from the request anomaly detector 122, the request processor 124 can examine the anomaly score to determine whether the incoming request represents a potentially anomalous request for the user. For example, in some embodiments, an anomaly score close to 0 may indicate that the incoming request is similar to non-anomalous requests used to train a variational autoencoder and thus indicate that the incoming request is likely to correspond to non-anomalous activity. Conversely, an anomaly score close to 1 may indicate that the incoming request is not similar to any of the non-anomalous requests used to train the variational autoencoder and thus indicate that the incoming request potentially corresponds to anomalous activity within the provider network 100.

In some embodiments, if the request processor 124 determines that the incoming request is non-anomalous, the request processor 124 executes the action(s) identified in the incoming request against the storage resources 118 specified in the request. For example, the actions may include authenticating a user, creating or deleting storage resources 118, copying data objects, and the like. In some embodiments, if the request processor 124 instead determines that the incoming request is a potentially anomalous request, the request processor 124 can take one or more actions to verify that the request is a legitimate request or determine that the request is instead an anomalous request that should not be executed. In some embodiments, a request processor 124 can use information about the user identified in the incoming request to obtain contact information for the user and push, to the user, a request to verify that the incoming request was generated by the user or perform other similar actions.

In some embodiments, the request processor 124 writes information about the incoming requests to an account activity monitoring service 104 (stored as event logs 108) for use in re-training or further training the variational autoencoder model 112 used by the request anomaly detector 122 to determine whether incoming requests are potentially anomalous for a given user. In some embodiments, a request processor 124 may write information about non-anomalous events to the account activity monitoring service 104 such that information about anomalous events may not be used to train the anomaly detection model. In some embodiments, user feedback about potentially anomalous events may be used to augment the historical user activity data stored in the event logs 108.

In some embodiments, a request anomaly detector 122 is configured to calculate a normalcy score for requests received from electronic devices 130 (or other sources) to be analyzed using a variational autoencoder model 112 trained by the autoencoder model trainer 110 using historical activity reflected in event logs 108, as discussed in further detail below. The normalcy score calculated for each request may, in some embodiments, be a conditional probability calculated based on a distance between a reconstructed version of the request to be analyzed and the request to be analyzed, and the normalcy score may represent a likelihood that the request to be analyzed is similar to the non-anomalous requests used to train the variational autoencoder. In some embodiments, a variational autoencoder model 112 may be used by a threat detection service 106 to analyze event logs 108 and to alert users to detected anomalous events.

As illustrated, a variational autoencoder model 112 includes an encoder 114 and a decoder 116. In some embodiments, the encoder 114 and the decoder 116 may be components of an autoencoder, such as a variational autoencoder or a Wasserstein autoencoder, that generates reconstructions of an input by encoding the input into a code in a latent space and decoding the code into the reconstruction of the input. In some embodiments, the variational autoencoder model 112 may be configured to recognize small variations of an a priori known request as a non-anomalous request (e.g., a request having a probability of being in the training data set of non-anomalous requests close to 1), while larger differences between an incoming request and the a priori known requests used to train the variational autoencoder may be recognized as potentially anomalous requests (e.g., a request having a probability of being in the training data set of non-anomalous requests close to 0).

In some embodiments, to calculate an anomaly score for an incoming request, the request anomaly detector 122 receives information about a request from a request processor 124 or from historical requests stored in activity log data. In some embodiments, each request may be defined by a set of event attributes and a set of contextual attributes. The set of event attributes may include, for example, information about the requested action, parameters for the requested action, the source system from which the request was received, a user agent associated with the request, and the like. In some embodiments, the information about the source system from which the request was received may include an organization that registered an Autonomous System Number (ASN) of the network from which the request was received (also referred to herein as an ASNOrg). The contextual attributes may include, for example, information about the request itself, such as information identifying a type of user that generated the request, an account identifier associated with the request, a username, a name of the computing resource (e.g., a storage resource 118 involved in the request), and the like. Information identifying the contextual attributes to use in determining whether an event is anomalous or non-anomalous may be defined by a user according to contextual information found to have been relevant to determining whether events correspond to anomalous or non-anomalous activity.

In some embodiments, to train a variational autoencoder model 112, an event profile is generated for each event from event logs 108 including a set of selected features such as, for example, an account identifier, a username, a user type, an event name, an ASNOrg, a user agent, and a request parameter. The request parameter features may be further parsed to extract additional features including, for example, a storage resource name (e.g., a bucket name) and authentication information. In some embodiments, based on the extracted features, the storage service events may be represented with the following embedded tuple:

StorageServiceEvent = (contextFeature, contentFeature), where
contextFeature = (accountId, userName, userType, bucketName)
contentFeature = (eventName + authenticationInfo, userAgent, ASNOrg)

In some embodiments, the category contextFeature is considered a profile of the user's identity. In this example, the bucketName feature is placed in the contextFeature category in part because each user may behave differently on different buckets (e.g., an operation on backup buckets might be distinct from buckets used by regular tasks). In some embodiments, the category contextFeature is used to represent users' operations under different contexts. For example, it may be assumed that under a specific context, a user's normal contextFeature should follow a regular pattern within a limited set of feature combinations.

In some embodiments, the contextual information may be encoded into a compressed representation of the context information prior to encoding the incoming request into an encoding in the latent space of a variational autoencoder model 112. In some embodiments, the contextual information may be encoded using a neural network configured to compress items of the contextual information into an encoding representing the contextual information of the request. In some embodiments, the individual items of contextual information may be combined into a contextual information vector, and the contextual information vector may be encoded using a neural network. Request anomaly detector 122 or threat detection service 106 may then, for example, generate a request vector representing the incoming request including information about the event to be invoked and the contextual information vector.

In some embodiments, an encoder 114 of a variational autoencoder model 114 generally maps an incoming request (or event log 108 reflecting a request) to an encoding in a latent space based on the request vector and a neural network trained to compress an incoming request into a code representing the incoming request. Generally, the encoder 114 processes the request vector representing the incoming request using one or more neural network layers and a bottleneck layer to select a code in a latent space representing the incoming request. In some embodiments, the one or more neural network layers may be a plurality of rectified linear units (ReLUs) that compress a request vector into a more compact representation. The bottleneck layer may use information about the parameters of a probability distribution, such as the mean and standard deviation of a probability distribution generated over the training data set for the incoming request, as bottleneck dimensions to encode the compressed representation of request vector x representing the incoming request generated by the one or more neural network layers into a code z in the latent space of a variational autoencoder. Encoder 114 may then output the code z in the latent space to a decoder 116 for further processing.

In some embodiments, the decoder 116 generally receives a code z from encoder 114 and attempts to generate a reconstruction x' of request attributes of the incoming request, given the contextual attributes (e.g., user type, account identifier, username, resource name) as context for the request. In some embodiments, decoder 116 may be structured as a plurality of neural networks configured to generate the approximation x' of the incoming request for each request attribute. These neural networks may include, for example, a plurality of neural network layers, such as ReLUs, that expand a code z into a larger mapping, and the output of the neural network may be processed through a probability output layer, such as a softmax layer, that generates a probability distribution that a reconstruction of one or more request attributes (e.g., an event name attribute, user agent attribute, and ASNOrg attribute) exists within a universe of known non-anomalous requests (e.g., as illustrated further in FIG. 2). Generally, the probability distribution for a reconstruction x' of a feature of a request x may have at least one value with a sufficiently high probability value if the request x is similar to requests that are known to be non-anomalous, while the probability distribution for the reconstruction x' may not have any values with a sufficiently high probability value is the request x is not similar to requests that are known to be non-anomalous. In some embodiments, a decoder 116 can output a normalcy score as the highest probability value in the probability distribution generated by the normalizing function, and the normalcy score can be used by a request processor 112 or threat detection service 106 to determine whether to allow or disallow execution of requests, to generate alerts of non-anomalous events, and the like.

In some embodiments, an encoder 114 and decoder 116 may be jointly trained but deployed on different systems. For example, an encoder 114 may execute on a first server in a distributed computing environment, and decoder 118 may execute on a second server in the distributed computing environment. In another example, an encoder 114 may be deployed to a system from which requests to perform actions within an object storage service 102 or other service are received, and a decoder 116 may be deployed to a request gateway that manages execution of incoming requests or to a threat detection service 106 monitoring for anomalies. In yet another example, the encoder 114 and decoder 118 may both execute on a same computing system configured to identify and flag anomalous alerts or to block transmission of requests identified as potentially anomalous.

In some embodiments, an autoencoder model trainer 110 is used to train the encoder 114 and decoder 116 of the variational autoencoder model 112 to determine whether events reflecting actions associated with an object storage service 102 correspond to anomalous or non-anomalous activity. In some embodiments, the autoencoder model trainer 110 trains the variational autoencoder model 112, for example, as a conditional variational autoencoder, a conditional Wasserstein autoencoder, or any other autoencoder that can reconstruct an approximation x' of an incoming request x and determine a likelihood that the incoming request x is similar to a universe of a priori known non-anomalous requests. In some embodiments, a request anomaly detector 114 or threat detection service 106 generates normalcy scores for each request and, in some embodiments, may calculate a distribution of generated anomaly scores to determine whether a user is potentially engaged in fraudulent activity relative to the object storage service 102 (or other service of the cloud provider network 100).

Figure 2:
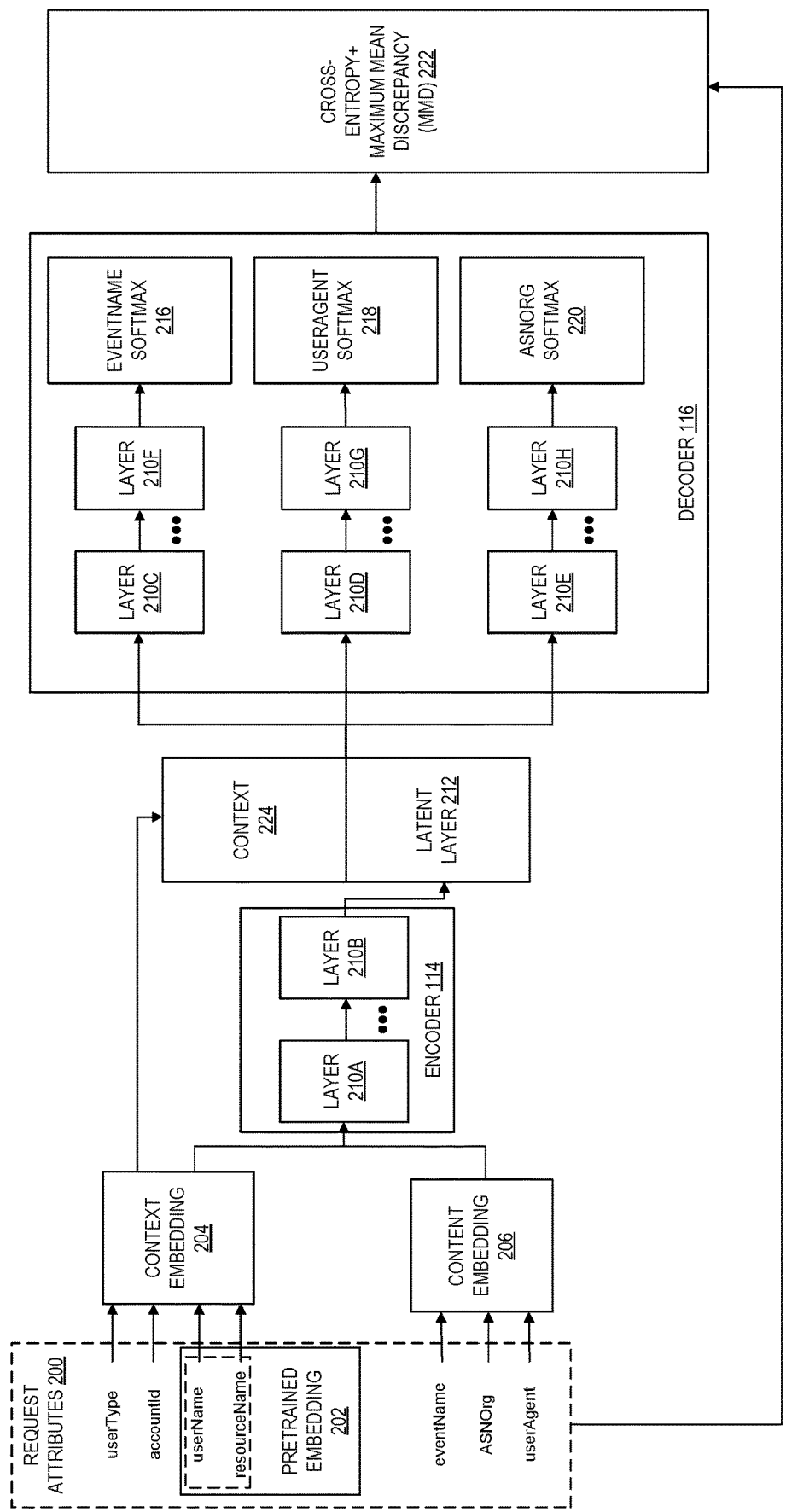
FIG. 2 is a diagram illustrating a structure of a variational autoencoder model that uses a pre-trained embedding layer for selected features to identify anomalous events associated with an object storage service according to some embodiments.

FIG. 2 is a diagram illustrating a structure of a variational autoencoder model that uses a pre-trained embedding layer for selected features to identify anomalous events associated with an object storage service according to some embodiments. As indicated above, in general, autoencoder-based detection methods involve learning to encode the normal patterns of the input data into a latent space and then reconstructing the inputs back from the latent space. In some embodiments, a variational autoencoder model is deployed with contextFeature and contentFeature as described above. For example, the contextFeature can be used by a variational autoencoder model as the conditional profile to reconstruct contentFeature. In some embodiments, given an object storage service event, if the model is able to successfully reconstruct the contentFeature, then the event is considered non-anomalous or normal and is otherwise flagged as an anomaly.

As shown, the variational autoencoder model in FIG. 2 uses a pre-trained embedding 202 for selected request attributes (e.g., a username attribute and a storage resource name attribute) from request attributes 200. In some embodiments, the model first encodes the concatenation of the embedding vectors including context embedding 204 and content embedding 206 (which is further provided as input to encoder 114 including fully-connected layers 210A and 210B to generate latent layer 212), and then reconstructs each content feature (e.g., the event name, ASN org., and user agent features) using a separated decoder 116 (e.g., fully-connected layers 210C–21011 and further using an event name softmax 216, user agent softmax 218, and ASN Org. softmax 220). In some embodiments, a loss function 222 involves using the cross-entropy loss between the predicted softmax values and the true values of the content features (e.g., the true value of the event name, ASN org., and user agent attributes). In some embodiments, to mitigate overfitting, a maximum mean discrepancy (MMD) strategy is used as the regularizer to penalize the encoded latent space distribution that does not match the prior distribution P(z). Formally, given an input tuple (contextFeatures (ctx), contentFeature(con)), in some embodiments, the model minimizes the following cost function:

$$\text{loss} = -\text{logloss}_{event} - \text{logloss}_{useragent} - \text{logloss}_{asnorg} + \lambda * MMD(P(z) \cdot Q(z|X) = con \cdot ctx))$$

where, $\lambda > 0$ is a regularization parameter controlling the penalty on the cost function, and Q represents the conditional distribution produced by the encoder.

Figure 3:
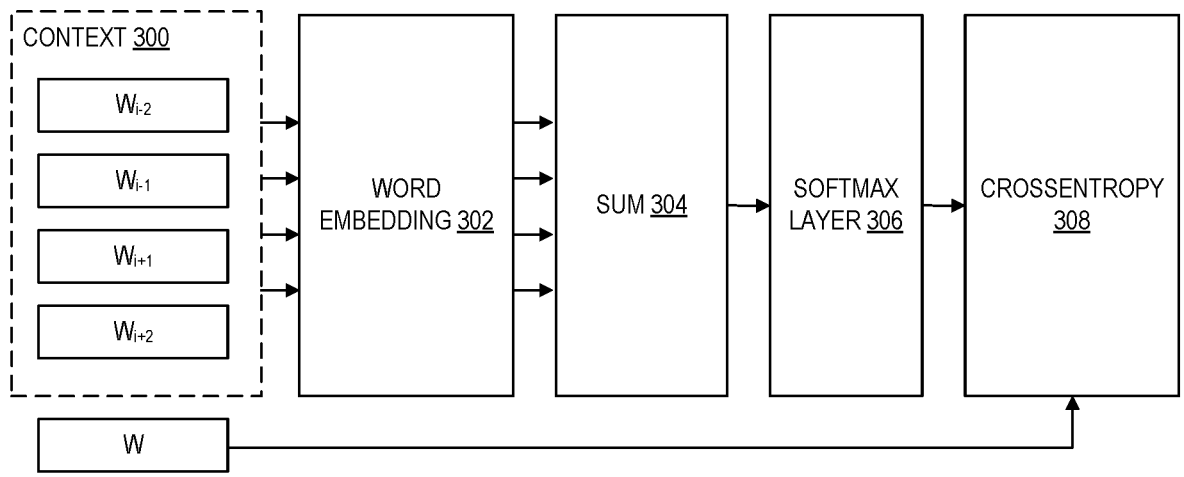
FIG. 3 is a diagram illustrating a model used to produce word embeddings used as part of a variational autoencoder model trained to identify anomalous events according to some embodiments.

FIG. 3 is a diagram illustrating a model used to produce word embeddings used as part of a variational autoencoder model trained to identify anomalous events according to some embodiments. In some embodiments, the Word2Vec model is a group of neural networks that are trained to reconstruct the word based on its linguistic context and may be used to generate embedding encodings for large corpus. In the example of the variational autoencoder model described herein, the Word2Vec model may be used to obtain an embedding representation based on the text similarity within the username and storage resources name features of the object storage service events used to train the variational autoencoder model. In some embodiments, a given text string is first parsed into a list of words by iterating each character with the following rules:
(1) if the character is the first capital letter, split the string;
(2) if the character is the first digit, split the string and replace digit string with a constant symbol #digit #;
(3) if it is a non-English letter or non-numeric character, split the string;
(4) if input is an empty string, replace it with a constant symbol #empty #; and
(5) each parsed word is converted to lower letters before added to a list.

As an example, given a text string "ProviderUserName-ABC@19" and the empty string " ", the application of the rules above results in two lists of words: [provider, user, name, abc, #digit #] and [#empty #]. Since most numbers that occur within a text string are used as indexes, a constant symbol is used to represent these numeric strings to reduce the absolute size of the word dictionary. The constant symbol #empty #is used to identify empty strings from zero-matching strings with no matching words in the word dictionary.

In some embodiments, after parsing the input strings, a word dictionary and a set of word lists associated with the input strings is obtained. To construct the training input for the Word2Vec model, each word in the list is paired with a context (e.g., to obtain context 300). In some embodiments, each word in the input string is enumerated and two neighboring words on both sides are used as the context. In some embodiments, for the first and last words that lack a side neighbor, the symbol "#pad #" is used as padding. Using the text string "ProviderUserName-ABC@19" and the resulting word list [amazon, user, name, abc, #digit #] as an example, the following five context-word pairs are generated: [<#pad #, #pad #, user, name><provider>], [<#pad #, provider, name, abc>, <user>], . . . , [<name, abc, #pad #, #pad #>, <#digit #>]. In some embodiments, the context-word pairs are vectorized using "one-hot" encoding and input into the Word2Vec model to learn the embedding vector for each word, as shown in FIG. 3.

In some embodiments, a continuous bag-of-words model (CBOW) model is used, where the model takes the context word list [$w_{i-2}$, $w_{i-1}$, $w_{i+1}$, $w_{i+2}$] as input, and then retrieves the related embedding vectors from the word embedding matrix 302. The sum 304 of the context embedding vectors are directly forwarded to the softmax layer 306 to predict word $w_i$. During training, the word embedding matrix 302 learns the word similarity metric according to its context. In other words, if two different words have the same context, then the distance between their embedding vectors is close to 0 and they are considered similar. This is useful in this context since the similarity metric can find connections between words that are not linguistically similar. For example, in the strings ProviderUsername$_{abc}$ and ProviderUsername$_{123}$, the words abc and 123 are not similar, but due to the context arising from the "ProviderUsername" portion of the strings, the words end up with similar embedding vectors from the Word2Vec model. For each text string, an average Word2Vec embedding vector of its words is used as the embedding vector. In some embodiments, two separate Word2vec models are trained for the storage resource name and username features, and the resulting pre-trained embedding output is then used as the input into the variational autoencoder model.

Figure 4:
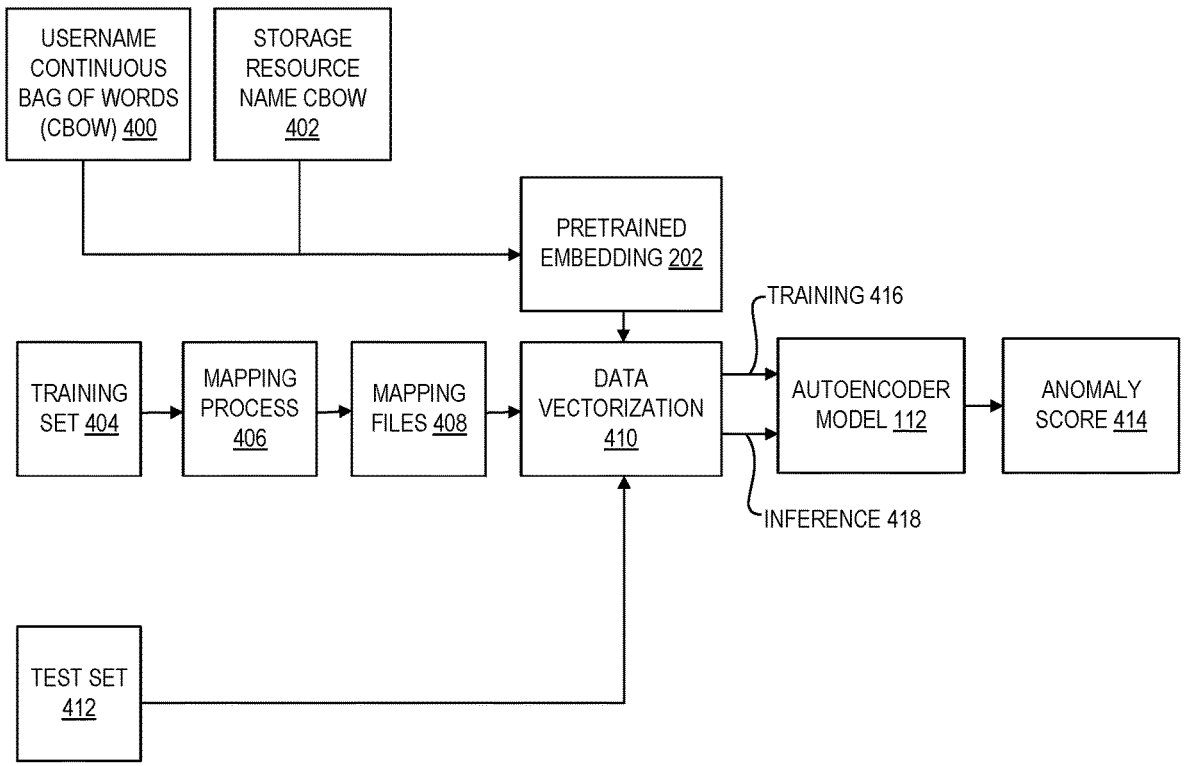
FIG. 4 is a diagram illustrating an architecture of an anomaly detection system according to some embodiments.

FIG. 4 is a diagram illustrating an example architecture of the anomaly detection system according to some embodiments. In some embodiments, the detection system is trained on a regular basis, e.g., using the event log data of the past n days as the training set 404 and the data of the next day as the test set 412. In some embodiments, a mapping process 406 is used to generate mapping files 408 from the training set 404 for each feature except the features username and storage resource name. Each mapping file 408 stores a one-to-one mapping between the unique feature values and a list of integers indices starting from 1. Here, the 0 index is reserved for any unseen feature values. The mapping files 408 and the word embedding matrix 202 generated from the Word2vec models are then provided as input into the data vectorization component 410. In this component, in some embodiments, the username and storage resource name features are processed in a different way from the other features. As discussed herein, the username and storage resource features are parsed into a list of words (e.g., username CBOW 400 and storage resource name CBOW 402) and then the embedding vectors from the word embedding matrix are retrieved. In some embodiments, a zero vector is assigned to any word that does not match anything in the embedding matrix 202. In some embodiments, the average vector for the list of words is used as the final embedding vector (where the number of parsed words may be used instead of the number of matched words as the denominator when calculating the average). This helps ensure, e.g., that a word list with many unseen words is converted into a vector close to the zero vector. For the other features, the mapping files 408 are used to convert the features into indices, using index 0 for unseen values, before passing the values through an embedding layer. At this point, all features have a numeric embedding vector, with unseen cases mapped to the zero vector or vectors close to zero.

In some embodiments, during training, the variational autoencoder model 112 learns the embedding representations of features (excluding the pretrained embeddings) and the conditional distribution of contentFeature from users' normal profile. After training, the reconstruction loss of all content features (excluding the regularizer MMD) is used as the anomaly score such that the greater the score, the more suspicious it is. During inference, in some embodiments, the maximum of the anomaly scores in the training set as the threshold to detect suspicious events. In other embodiments, other types of thresholds can be used.

Figure 5:
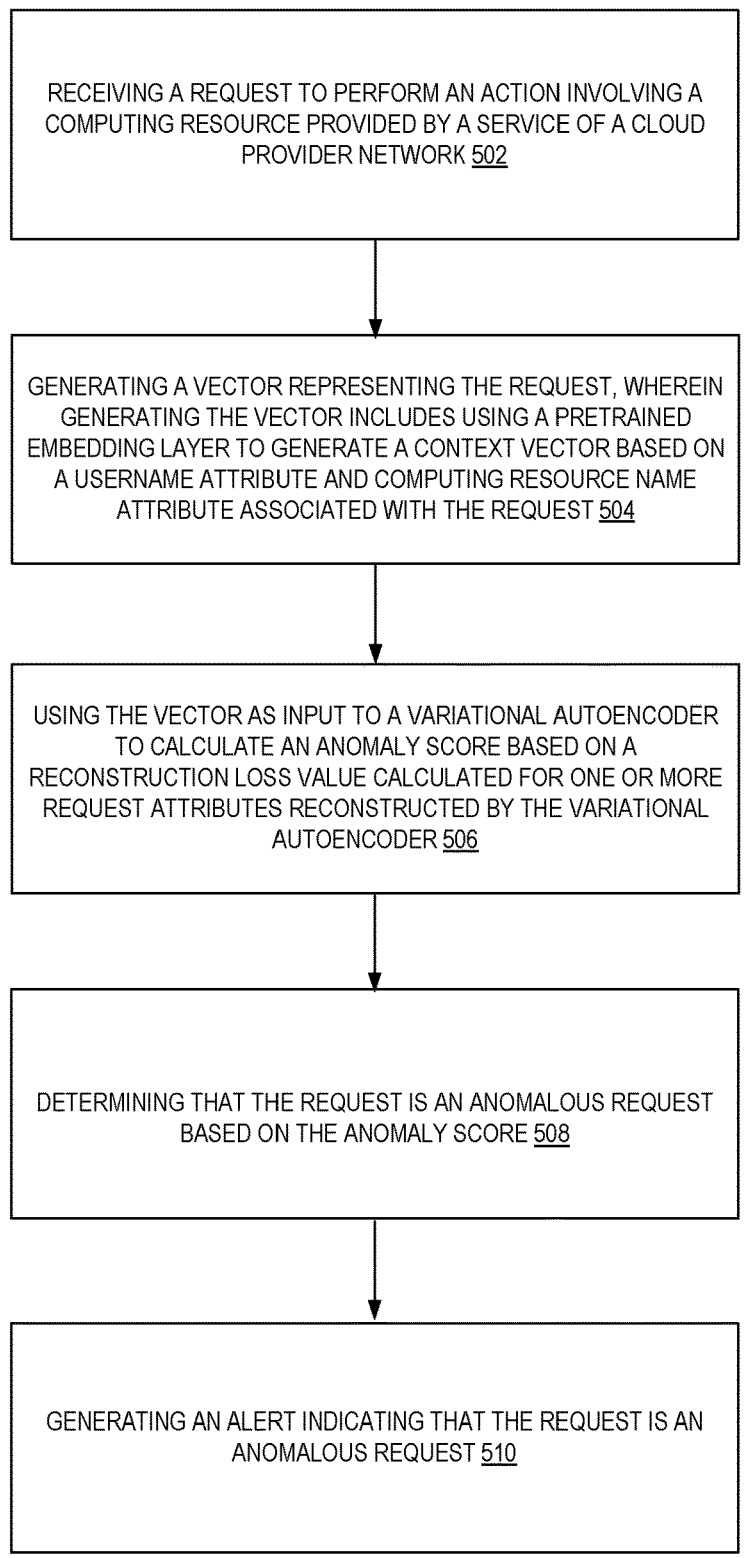
FIG. 5 is a flow diagram illustrating operations of a method for enabling the identification of anomalous events associated with an object storage service of a cloud provider network according to some embodiments.

FIG. 5 is a flow diagram illustrating operations 500 of a method for enabling the identification of anomalous events associated with an object storage service of a cloud provider network using a variational autoencoder model including a pre-trained embedding for selected features of events according to some embodiments. Some or all of the operations 500 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 500 are performed by a threat detection service 106 or object storage service 102 of the other figures.

The operations 500 include, at block 502, receiving a request to perform an action involving a computing resource provided by a service of a cloud provider network.

The operations 500 further include, at block 504, generating a vector representing the request, wherein generating the vector includes using a pretrained embedding layer to generate a context vector based on a username attribute and computing resource name attribute associated with the request.

The operations 500 further include, at block 506, using the vector as input to a variational autoencoder to calculate an anomaly score based on a reconstruction loss value calculated for one or more request attributes reconstructed by the variational autoencoder.

The operations 500 further include, at block 508, determining that the request is an anomalous request based on the anomaly score.

The operations 500 further include, at block 510, generating an alert indicating that the request is an anomalous request.

In some embodiments, the operations further include obtaining a training data set from log data reflecting requests received by an object storage service, wherein each request in the training data set comprises a plurality of request attributes; training the autoencoder to reconstruct approximations of requests based on the received training data set, wherein training the autoencoder comprises: training an encoder neural network to encode requests into latent space representations of the requests, training a decoder neural network to generate an approximate reconstruction of the requests from the latent space representation of the requests, and training the pretrained embedding layer based on the username and storage resource name request attributes in the training data set.

In some embodiments, the operations further include splitting each of the username attribute and the storage resource name attribute into a plurality of text tokens, wherein the splitting includes replacing digit strings in the username attribute or storage resource name attribute with a constant symbol; and using the plurality of tokens as input to the pretrained embedding layer to obtain embedding vectors for each of the username attribute and storage resource name attribute.

In some embodiments, the operations further include generating a first vector representing first attributes of the request and a second vector representing second attributes of the request, wherein the first vector includes values generated using the username attribute and the computing resource name attribute as input to the pretrained embedding layer.

In some embodiments, the operations further include generating a first vector representing first attributes of the request and a second vector representing second attributes of the request, wherein the first vector includes values generated using the username attribute and the computing resource name attribute as input to the pretrained embedding layer; using the first vector and second vector as input to an a variational autoencoder to: map the second vector to a code in a latent space using an encoder neural network, wherein the code is an encoded representation of one or more attributes of the received request from which an approximation of the one or more attributes of the received request can be reconstructed, and reconstruct request attributes from the encoded representation of the request and the first vector using a decoder neural network.

In some embodiments, the operations further include generating, by a threat detection service, an alert indicating that the request is an anomalous request based on the anomaly score. In some embodiments, the operations further include blocking, by an object storage service of the cloud provider network, the request based on determining that the request is an anomalous request.

In some embodiments, determining that the request is an anomalous request includes determining that the anomaly score exceeds a maximum anomaly score generated based on a training data set used to train the variational autoencoder.

In some embodiments, the request is associated with a user account of the cloud provider network, and wherein determining that the request is an anomalous request includes determining that the anomaly score exceeds a maximum anomaly score generated based on a training data set associated with the user account and used to train the variational autoencoder.

In some embodiments, the operations further include generating, for a request attribute associated with requests in a training data set, a mapping file storing a mapping between unique attribute values for the request attribute and integer indices; and using the mapping file to generate the vector representing the request based on an attribute value for the request attribute associated with the request.

In some embodiments, the computing resource is one of: a storage bucket provided an object storage service, a database object provided by a database service, a computing resource provided by a hardware virtualization service, or a networking resource provided by a networking service.

Figure 6:
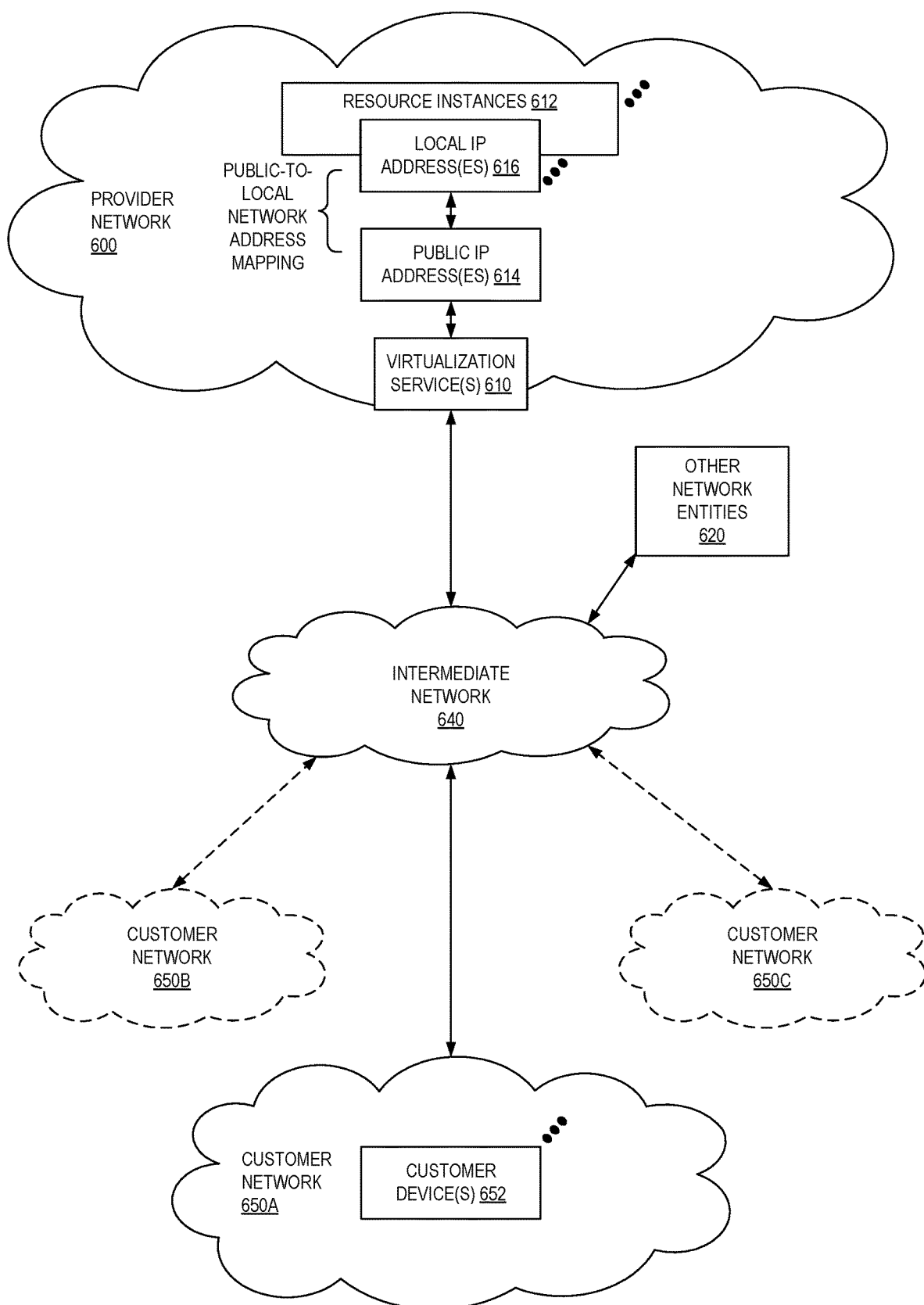
FIG. 6 illustrates an example provider network environment according to some embodiments.

FIG. 6 illustrates an example provider network (or "service provider system") environment according to some embodiments. A provider network 600 may provide resource virtualization to customers via one or more virtualization services 610 that allow customers to purchase, rent, or otherwise obtain instances 612 of virtualized resources, including but not limited to computation and storage resources, implemented on devices within the provider network or networks in one or more data centers. Local Internet Protocol (IP) addresses 616 may be associated with the resource instances 612; the local IP addresses are the internal network addresses of the resource instances 612 on the provider network 600. In some embodiments, the provider network 600 may also provide public IP addresses 614 and/or public IP address ranges (e.g., Internet Protocol version 4 (IPv4) or Internet Protocol version 6 (IPv6) addresses) that customers may obtain from the provider 600.

Conventionally, the provider network 600, via the virtualization services 610, may allow a customer of the service provider (e.g., a customer that operates one or more client networks 650A-650C including one or more customer device(s) 652) to dynamically associate at least some public IP addresses 614 assigned or allocated to the customer with particular resource instances 612 assigned to the customer. The provider network 600 may also allow the customer to remap a public IP address 614, previously mapped to one virtualized computing resource instance 612 allocated to the customer, to another virtualized computing resource instance 612 that is also allocated to the customer. Using the virtualized computing resource instances 612 and public IP addresses 614 provided by the service provider, a customer of the service provider such as the operator of customer network(s) 650A-650C may, for example, implement customer-specific applications and present the customer's applications on an intermediate network 640, such as the Internet. Other network entities 620 on the intermediate network 640 may then generate traffic to a destination public IP address 614 published by the customer network(s) 650A-650C; the traffic is routed to the service provider data center, and at the data center is routed, via a network substrate, to the local IP address 616 of the virtualized computing resource instance 612 currently mapped to the destination public IP address 614. Similarly, response traffic from the virtualized computing resource instance 612 may be routed via the network substrate back onto the intermediate network 640 to the source entity 620.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 600; a customer may then assign their allocated public IP addresses to particular resource instances allocated to the customer. These public IP addresses may be referred to as customer public IP addresses, or simply customer IP addresses. Instead of being assigned by the provider network 600 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 7:
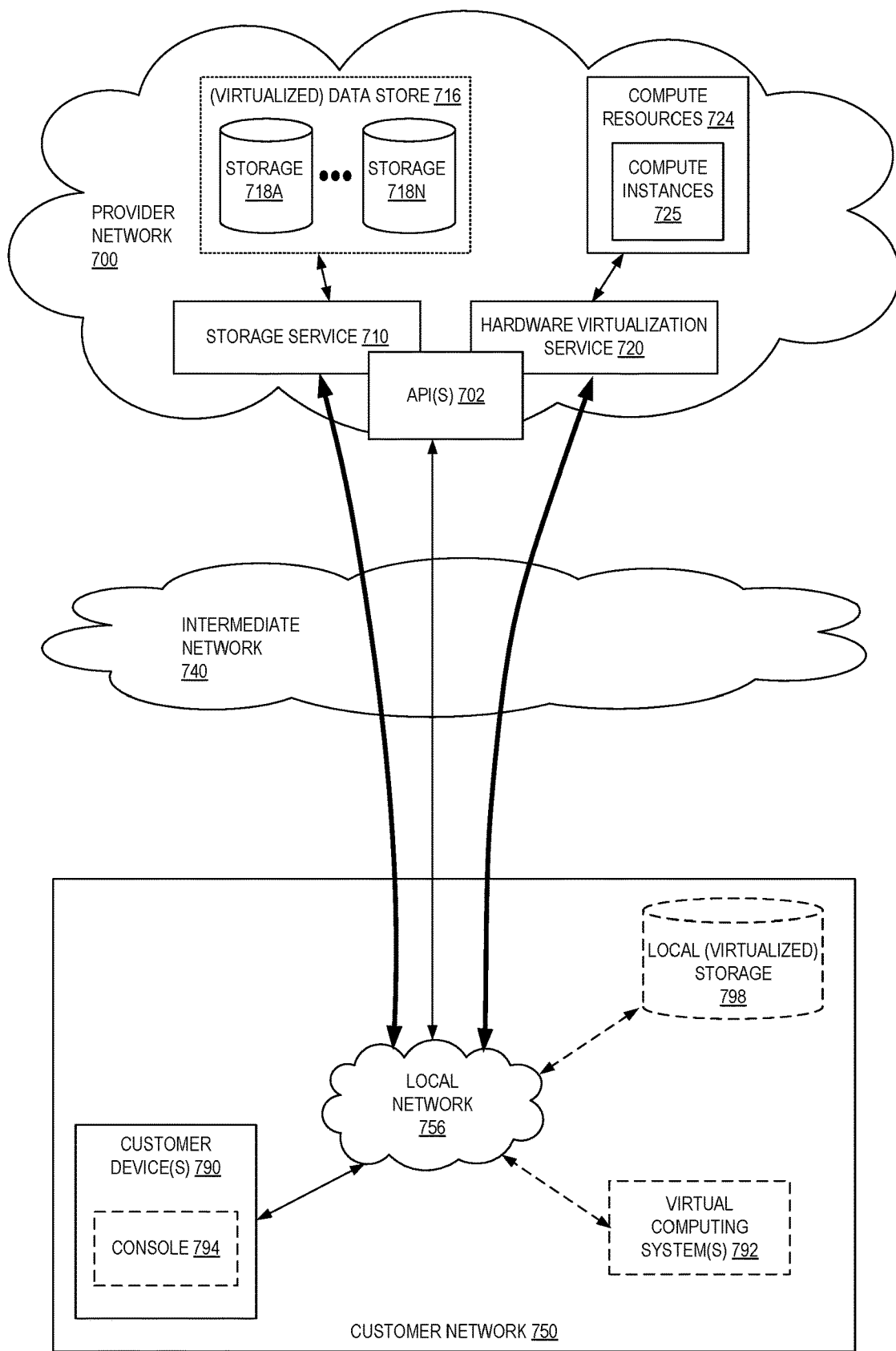
FIG. 7 is a block diagram of an example provider network that provides a storage service and a hardware virtualization service to customers according to some embodiments.

FIG. 7 is a block diagram of an example provider network that provides a storage service and a hardware virtualization service to customers, according to some embodiments. Hardware virtualization service 720 provides multiple compute resources 724 (e.g., compute instances 725 such as VMs) to customers. The compute resources 724 may, for example, be rented or leased to customers of the provider network 700 (e.g., to a customer that implements customer network 750). Each computation resource 724 may be provided with one or more local IP addresses. Provider network 700 may be configured to route packets from the local IP addresses of the compute resources 724 to public Internet destinations, and from public Internet sources to the local IP addresses of compute resources 724.

Provider network 700 may provide a customer network 750, for example coupled to intermediate network 740 via local network 756, the ability to implement virtual computing systems 792 via hardware virtualization service 720 coupled to intermediate network 740 and to provider network 700. In some embodiments, hardware virtualization service 720 may provide one or more APIs 702, for example a web services interface, via which a customer network 750 may access functionality provided by the hardware virtualization service 720, for example via a console 794 (e.g., a web-based application, standalone application, mobile application, etc.). In some embodiments, at the provider network 700, each virtual computing system 792 at customer network 750 may correspond to a computation resource 724 that is leased, rented, or otherwise provided to customer network 750.

From an instance of a virtual computing system 792 and/or another customer device 790 (e.g., via console 794), the customer may access the functionality of storage service 710, for example via one or more APIs 702, to access data from and store data to storage resources 718A-718N of a virtual data store 716 (e.g., a folder or "bucket", a virtualized volume, a database, etc.) provided by the provider network 700. In some embodiments, a virtualized data store gateway (not shown) may be provided at the customer network 750 that may locally cache at least some data, for example frequently-accessed or critical data, and that may communicate with storage service 710 via one or more communications channels to upload new or modified data from a local cache so that the primary store of data (virtualized data store 716) is maintained. In some embodiments, a user, via a virtual computing system 792 and/or on another customer device 790, may mount and access virtual data store 716 volumes via storage service 710 acting as a storage virtualization service, and these volumes may appear to the user as local (virtualized) storage 798.

While not shown in FIG. 7, the virtualization service(s) may also be accessed from resource instances within the provider network 700 via API(s) 702. For example, a customer, appliance service provider, or other entity may access a virtualization service from within a respective virtual network on the provider network 700 via an API 702 to request allocation of one or more resource instances within the virtual network or within another virtual network.

Figure 8:
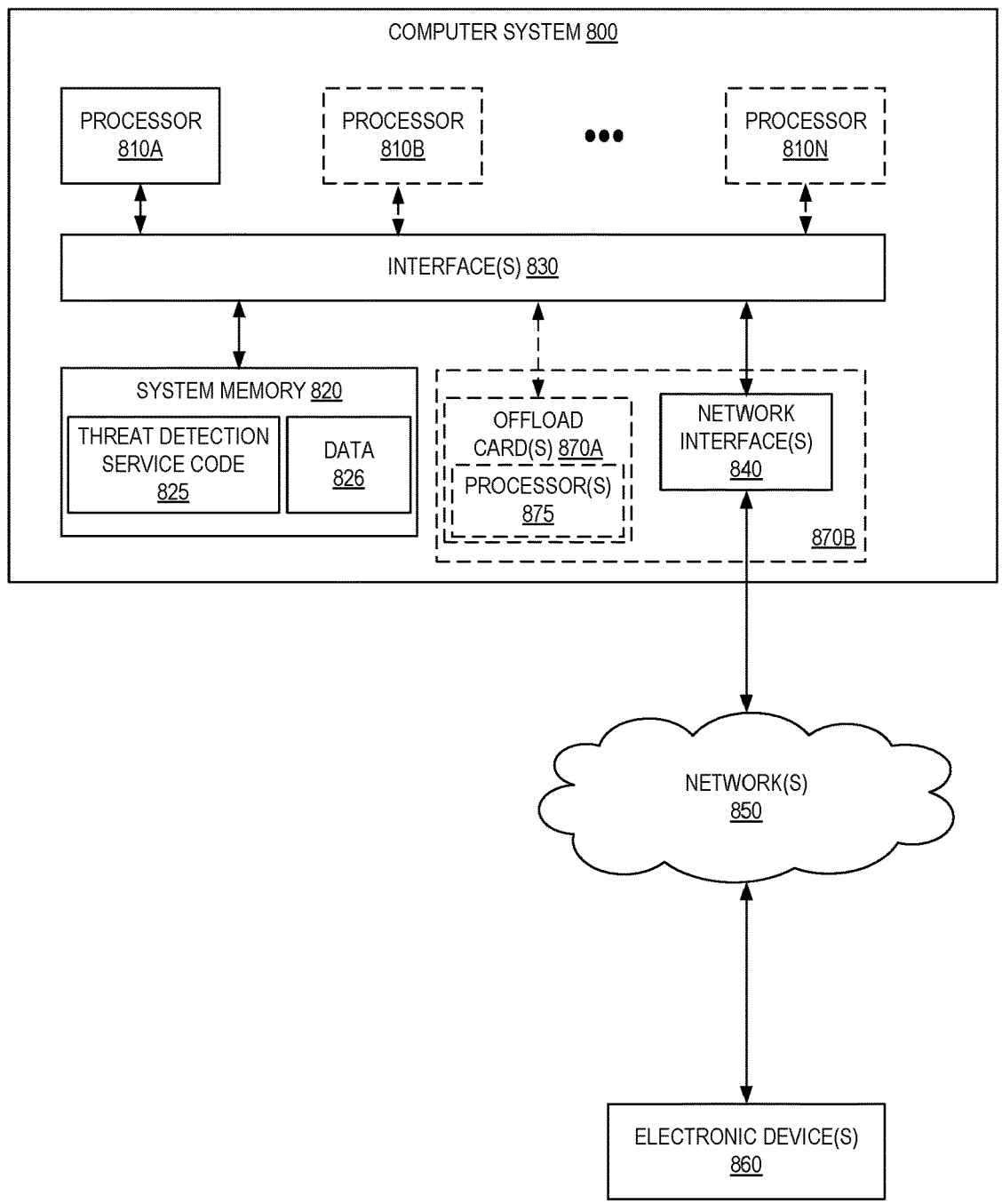
FIG. 8 is a block diagram illustrating an example computer system that may be used in some embodiments.

In some embodiments, a system that implements a portion or all of the techniques described herein may include a general-purpose computer system that includes or is configured to access one or more computer-accessible media, such as computer system 800 illustrated in FIG. 8. In the illustrated embodiment, computer system 800 includes one or more processors 810 coupled to a system memory 820 via an input/output (I/O) interface 830. Computer system 800 further includes a network interface 840 coupled to I/O interface 830. While FIG. 8 shows computer system 800 as a single computing device, in various embodiments a computer system 800 may include one computing device or any number of computing devices configured to work together as a single computer system 800.

In various embodiments, computer system 800 may be a uniprocessor system including one processor 810, or a multiprocessor system including several processors 810 (e.g., two, four, eight, or another suitable number). Processors 810 may be any suitable processors capable of executing instructions. For example, in various embodiments, processors 810 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 810 may commonly, but not necessarily, implement the same ISA.

System memory 820 may store instructions and data accessible by processor(s) 810. In various embodiments, system memory 820 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 820 as treat detection service code 825 (e.g., executable to implement, in whole or in part, the threat detection service 106) and data 826.

In one embodiment, I/O interface 830 may be configured to coordinate I/O traffic between processor 810, system memory 820, and any peripheral devices in the device, including network interface 840 or other peripheral interfaces. In some embodiments, I/O interface 830 may perform any necessary protocol, timing or other data transformations to convert data signals from one component (e.g., system memory 820) into a format suitable for use by another component (e.g., processor 810). In some embodiments, I/O interface 830 may include support for devices attached through various types of peripheral buses, such as a variant of the Peripheral Component Interconnect (PCI) bus standard or the Universal Serial Bus (USB) standard, for example. In some embodiments, the function of I/O interface 830 may be split into two or more separate components, such as a north bridge and a south bridge, for example. Also, in some embodiments some or all of the functionality of I/O interface 830, such as an interface to system memory 820, may be incorporated directly into processor 810.

Network interface 840 may be configured to allow data to be exchanged between computer system 800 and other devices 860 attached to a network or networks 850, such as other computer systems or devices as illustrated in FIG. 1, for example. In various embodiments, network interface 840 may support communication via any suitable wired or wireless general data networks, such as types of Ethernet network, for example. Additionally, network interface 840 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 800 includes one or more offload cards 870A or 870B (including one or more processors 875, and possibly including the one or more network interfaces 840) that are connected using an I/O interface 830 (e.g., a bus implementing a version of the Peripheral Component Interconnect—Express (PCI-E) standard, or another interconnect such as a QuickPath interconnect (QPI) or UltraPath interconnect (UPI)). For example, in some embodiments the computer system 800 may act as a host electronic device (e.g., operating as part of a hardware virtualization service) that hosts compute resources such as compute instances, and the one or more offload cards 870A or 870B execute a virtualization manager that can manage compute instances that execute on the host electronic device.

As an example, in some embodiments the offload card(s) 870A or 870B can perform compute instance management operations such as pausing and/or un-pausing compute instances, launching and/or terminating compute instances, performing memory transfer/copying operations, etc. These management operations may, in some embodiments, be performed by the offload card(s) 870A or 870B in coordination with a hypervisor (e.g., upon a request from a hypervisor) that is executed by the other processors 810A-810N of the computer system 800. However, in some embodiments the virtualization manager implemented by the offload card(s) 870A or 870B can accommodate requests from other entities (e.g., from compute instances themselves), and may not coordinate with (or service) any separate hypervisor.

In some embodiments, system memory 820 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 800 via I/O interface 830. A non-transitory computer-accessible storage medium may also include any volatile or nonvolatile media such as RAM (e.g., SDRAM, double data rate (DDR) SDRAM, SRAM, etc.), read only memory (ROM), etc., that may be included in some embodiments of computer system 800 as system memory 820 or another type of memory. Further, a computer-accessible medium may include transmission media or signals such as electrical, electromagnetic, or digital signals, conveyed via a communication medium such as a network and/or a wireless link, such as may be implemented via network interface 840.

Various embodiments discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C #or C++, or any scripting language, such as Perl, Python, PHP, or TCL, as well as combinations thereof. The server(s) may also include database servers, including without limitation those commercially available from Oracle(R), Microsoft(R), Sybase(R), IBM(R), etc. The database servers may be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 718A-718N) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
receiving a request to perform an action involving a storage resource of an object storage service of a cloud provider network;
generating a first vector representing first attributes of the request and a second vector representing second attributes of the request, wherein the first vector includes values generated using a username attribute and storage resource name attribute associated with the request as input to a pretrained embedding layer, and wherein generating the values comprises splitting each of the username attribute and the storage resource name attribute into a plurality of text tokens, wherein the splitting includes replacing digit strings in the username attribute or storage resource name attribute with a constant symbol, and using the plurality of text tokens as the input to the pretrained embedding layer;
using the first vector and second vector as input to a variational autoencoder to:
map the first vector and the second vector to a code in a latent space using an encoder neural network, wherein the code is an encoded representation of one or more attributes of the received request from which an approximation of the one or more attributes of the received request can be reconstructed, and
reconstruct request attributes from the encoded representation of the request and the first vector using a decoder neural network;
calculating an anomaly score based on a reconstruction loss value calculated for the reconstructed request attributes; and
based on the anomaly score, performing an action.

2. The computer-implemented method of claim 1, further comprising:
obtaining a training data set from log data reflecting requests received by an object storage service, wherein each request in the training data set comprises a plurality of request attributes; and
training the variational autoencoder to reconstruct approximations of requests based on the received training data set, wherein training the variational autoencoder comprises:
training an encoder neural network to encode requests into latent space representations of the requests,
training a decoder neural network to generate an approximate reconstruction of the requests from the latent space representation of the requests, and
training the pretrained embedding layer based on the username and storage resource name request attributes in the training data set.

3. The computer-implemented method of claim 1, further comprising:
using the plurality of tokens as input to the pretrained embedding layer to obtain embedding vectors for each of the username attribute and storage resource name attribute.

4. A computer-implemented method comprising:
receiving a request to perform an action involving a computing resource provided by a service of a cloud provider network;
generating a vector representing the request, wherein generating the vector includes using a pretrained embedding layer to generate a context vector based on a username attribute and computing resource name attribute associated with the request, wherein generating the context vector comprises splitting each of the username attribute and the computing resource name attribute into a plurality of text tokens, wherein the splitting includes replacing digit strings in the username attribute or computing resource name attribute with a constant symbol, and using the plurality of text tokens as input to the pretrained embedding layer;
using the vector as input to a variational autoencoder to calculate an anomaly score based on a reconstruction loss value calculated for one or more request attributes reconstructed by the variational autoencoder;
determining that the request is an anomalous request based on the anomaly score; and
generating an alert indicating that the request is an anomalous request.

5. The computer-implemented method of claim 4, further comprising:
obtaining a training data set from log data reflecting requests received by the service, wherein each request in the training data set comprises a plurality of request attributes; and
training the variational autoencoder to reconstruct approximations of requests based on the received training data set, wherein training the variational autoencoder comprises:
training an encoder neural network to encode requests into latent space representations of the requests,
training a decoder neural network to generate an approximate reconstruction of the requests from the latent space representation of the requests, and
training the pretrained embedding layer based on the username and computing resource name request attributes in the training data set.

6. The computer-implemented method of claim 4, further comprising:
using the plurality of text tokens as input to the pretrained embedding layer to obtain embedding vectors for each of the username attribute and storage resource name attribute.

7. The computer-implemented method of claim 4, further comprising generating a first vector representing first attributes of the request and a second vector representing second attributes of the request, wherein the first vector includes values generated using the username attribute and the computing resource name attribute as input to the pretrained embedding layer.

8. The computer-implemented method of claim 4, further comprising:
generating a first vector representing first attributes of the request and a second vector representing second attributes of the request, wherein the first vector includes values generated using the username attribute and the computing resource name attribute as input to the pretrained embedding layer; and
using the first vector and second vector as input to a variational autoencoder to:
map the second vector to a code in a latent space using an encoder neural network, wherein the code is an encoded representation of one or more attributes of the received request from which an approximation of the one or more attributes of the received request can be reconstructed, and reconstruct request attributes from the encoded representation of the request and the first vector using a decoder neural network.

9. The computer-implemented method of claim 4, further comprising generating, by a threat detection service, an alert indicating that the request is an anomalous request based on the anomaly score.

10. The computer-implemented method of claim 4, further comprising blocking, by an object storage service of the cloud provider network, the request based on determining that the request is an anomalous request.

11. The computer-implemented method of claim 4, wherein determining that the request is an anomalous request includes determining that the anomaly score exceeds a maximum anomaly score generated based on a training data set used to train the variational autoencoder.

12. The computer-implemented method of claim 4, wherein the request is associated with a user account of the cloud provider network, and wherein determining that the request is an anomalous request includes determining that the anomaly score exceeds a maximum anomaly score generated based on a training data set associated with the user account and used to train the variational autoencoder.

13. The computer-implemented method of claim 4, further comprising:

generating, for a request attribute associated with requests in a training data set, a mapping file storing a mapping between unique attribute values for the request attribute and integer indices; and using the mapping file to generate the vector representing the request based on an attribute value for the request attribute associated with the request.

14. The computer-implemented method of claim 4, wherein the computing resource is one of: a storage bucket provided an object storage service, a database object provided by a database service, a computing resource provided by a hardware virtualization service, or a networking resource provided by a networking service.

15. A system comprising:

a first one or more electronic devices to implement an object storage service in a multi-tenant provider network, the object storage service including instructions that upon execution cause the object storage service to:

receive a request to perform an action involving a computing resource provided by a service of a cloud provider network, and cause an account activity monitoring service to generate an event log reflecting the request; and a second one or more electronic devices to implement a threat detection service in the multi-tenant provider network, the threat detection service including instructions that upon execution cause the threat detection service to:

obtain the event log reflecting the request from the account activity monitoring service;

generate a vector representing the request, wherein generating the vector includes using a pretrained embedding layer to generate a context vector based on a username attribute and computing resource name attribute associated with the request, wherein generating the context vector comprises splitting each of the username attribute and the computing resource name attribute into a plurality of text tokens, wherein the splitting includes replacing digit strings in the username attribute or computing resource name attribute with a constant symbol, and using the plurality of text tokens as input to the pretrained embedding layer;

use the vector as input to a variational autoencoder to calculate an anomaly score based on a reconstruction loss value calculated for one or more request attributes reconstructed by the variational autoencoder;

determine that the request is an anomalous request based on the anomaly score; and generate an alert indicating that the request is an anomalous request.

16. The system of claim 15, wherein the threat detection service includes further instructions that upon execution cause the threat detection service further to:

obtain a training data set from log data reflecting requests received by the service, wherein each request in the training data set comprises a plurality of request attributes; and train the variational autoencoder to reconstruct approximations of requests based on the received training data set, wherein training the variational autoencoder comprises:

training an encoder neural network to encode requests into latent space representations of the requests, training a decoder neural network to generate an approximate reconstruction of the requests from the latent space representation of the requests, and training the pretrained embedding layer based on the username and computing resource name request attributes in the training data set.

17. The system of claim 15, wherein the threat detection service includes further instructions that upon execution cause the threat detection service further to:

use the plurality of text tokens as input to the pretrained embedding layer to obtain embedding vectors for each of the username attribute and storage resource name attribute.

18. The system of claim 15, wherein the threat detection service includes further instructions that upon execution cause the threat detection service further to generate a first vector representing first attributes of the request and a second vector representing second attributes of the request, wherein the first vector includes values generated using the username attribute and the computing resource name attribute as input to the pretrained embedding layer.

19. The system of claim 15, wherein the threat detection service includes further instructions that upon execution cause the threat detection service further to:

generate a first vector representing first attributes of the request and a second vector representing second attributes of the request, wherein the first vector includes values generated using the username attribute and the computing resource name attribute as input to the pretrained embedding layer; and use the first vector and second vector as input to a variational autoencoder to:

map the second vector to a code in a latent space using an encoder neural network, wherein the code is an encoded representation of one or more attributes of the received request from which an approximation of the one or more attributes of the received request can be reconstructed, and reconstruct request attributes from the encoded representation of the request and the first vector using a decoder neural network.

20. The system of claim 15, wherein determining that the request is an anomalous request includes determining that the anomaly score exceeds a maximum anomaly score generated based on a training data set used to train the variational autoencoder.

\* \* \* \* \*